(12) United States Patent
Hoekstra et al.

(10) Patent No.: US 6,489,588 B1
(45) Date of Patent: Dec. 3, 2002

(54) METHOD AND APPARATUS FOR SEPARATING NON-METALLIC MATERIALS

(75) Inventors: Brian Hoekstra, Orlando, FL (US); Roger Flannigan, Phoenix, AZ (US); Daniel Wegerif, Merritt Island, FL (US)

(73) Assignee: Applied Photonics, Inc., Orlando, FL (US)

( * ) Notice: Subject to any disclaimer, the term of this patent is extended or adjusted under 35 U.S.C. 154(b) by 63 days.

(21) Appl. No.: 09/718,453

(22) Filed: Nov. 22, 2000

Related U.S. Application Data

(60) Provisional application No. 60/167,285, filed on Nov. 24, 1999.

(51) Int. Cl.$^7$ ............................................. B23K 26/14
(52) U.S. Cl. ......................... 219/121.67; 219/121.68; 219/121.73; 219/121.74
(58) Field of Search ................ 219/121.67, 121.68, 219/121.73, 121.6, 121.74

(56) References Cited

U.S. PATENT DOCUMENTS

| | | | |
|---|---|---|---|
| 1,720,883 A | 7/1929 | Campbell et al. | |
| 3,112,850 A | 12/1963 | Garibotti | 225/2 |
| 3,453,097 A | 7/1969 | Hafner | 65/112 |
| 3,543,979 A | 12/1970 | Grove et al. | 225/2 |
| 3,589,883 A | 6/1971 | Dear | 65/97 |
| 3,597,578 A | 8/1971 | Sullivan et al. | 219/121 L |
| 3,604,890 A | 9/1971 | Mullaney et al. | 219/121 L |
| 3,610,871 A | 10/1971 | Lumley | 219/121 L |
| 3,629,545 A | 12/1971 | Graham et al. | 219/121 L |
| 3,695,497 A | 10/1972 | Dear | 225/2 |
| 3,749,878 A | 7/1973 | Sullivan et al. | 219/121 L |
| 3,790,362 A | 2/1974 | Dahlberg et al. | 65/174 |
| 3,795,502 A | 3/1974 | DeTorre | 65/174 |
| 3,800,991 A | 4/1974 | Grove et al. | 225/2 |
| 3,935,419 A | 1/1976 | Lambert et al. | 219/121 LM |
| 4,045,201 A | 8/1977 | Caffarella et al. | 65/105 |
| 4,467,168 A | 8/1984 | Morgan et al. | 219/121 LG |
| 4,546,231 A | 10/1985 | Gresser et al. | 219/121 LN |
| 4,682,003 A | 7/1987 | Minakawa et al. | 219/121 LN |

(List continued on next page.)

FOREIGN PATENT DOCUMENTS

| | | | | |
|---|---|---|---|---|
| DE | 28 13 302 B1 | 1/1979 | | C03B/33/02 |
| DE | 42 15 561 C2 | 4/1995 | | B23K/26/14 |
| EP | 0 062 484 A1 | 3/1982 | | C03B/33/08 |
| EP | 0 397 237 A1 | 11/1990 | | C03B/33/09 |
| EP | 0 458 180 A3 | 5/1991 | | B23K/26/14 |
| EP | 0 397 237 B1 | 5/1994 | | C03B/33/09 |
| EP | 0 397 236 B1 | 10/1994 | | C03B/33/09 |
| EP | 0 618 037 A1 | 10/1994 | | B23K/26/14 |
| EP | 0 872 303 A2 | 10/1998 | | B23K/26/06 |
| JP | 59-87996 | 5/1984 | | B23K/26/14 |
| JP | 60-46892 | 3/1985 | | B23K/26/06 |
| JP | 64-53794 | 3/1989 | | B23K/26/06 |
| JP | 64-62294 | 3/1989 | | B23K/26/06 |
| JP | 1-143783 | 6/1989 | | B23K/26/06 |
| JP | 1-143784 | 6/1989 | | B23K/26/06 |
| JP | 1-306088 | 12/1989 | | B23K/26/06 |
| JP | 2-217187 | 8/1990 | | B23K/26/06 |
| JP | 2-263590 | 10/1990 | | B23K/26/06 |
| JP | 2-295688 | 12/1990 | | B23K/26/00 |
| JP | 4-118190 | 4/1992 | | B23K/26/00 |
| SU | 1231813 A1 | 4/1991 | | C03B/33/04 |
| WO | 93/09909 | 5/1993 | | B23K/26/14 |
| WO | 93/20015 | 10/1993 | | C03B/33/09 |

*Primary Examiner*—M. Alexandra Elve
(74) *Attorney, Agent, or Firm*—Allen, Dyer, Doppelt, Milbrath & Gilchrist, P.A.

(57) ABSTRACT

A method and apparatus for splitting non-metallic substrates includes a laser for generating a laser beam. An integrated cracking devices receives the laser beam and directs the laser beam onto a non-metallic substrate to define the heat affected zone and quench the substrate at a quenching region contained within the heat affected zone. This integrated cracking device includes a housing and optics fitted within the housing for receiving and directing the laser beam onto the substrate. A quenching nozzle is mounted on the housing for quenching the substrate at a quenching region defined within the heat affected zone.

17 Claims, 10 Drawing Sheets

U.S. PATENT DOCUMENTS

| | | |
|---|---|---|
| 4,795,878 A | 1/1989 | Babitsky et al. .......... 219/121.8 |
| 5,084,604 A | 1/1992 | Dekker et al. .......... 219/121.72 |
| 5,103,073 A | 4/1992 | Danilov et al. ......... 219/121.68 |
| 5,132,505 A | 7/1992 | Zonneveld et al. ...... 219/121.6 |
| 5,138,131 A | 8/1992 | Nishikawa et al. ..... 219/121.67 |
| 5,149,937 A | 9/1992 | Babel et al. ........... 219/121.68 |
| 5,154,334 A | 10/1992 | Dekker et al. ................. 225/2 |
| 5,223,692 A | 6/1993 | Lozier et al. .......... 219/121.67 |
| 5,254,833 A | 10/1993 | Okiyama ............... 219/121.68 |
| 5,463,200 A | 10/1995 | James et al. ........... 219/121.68 |
| 5,571,429 A | 11/1996 | Smith et al. ........... 219/121.68 |
| 5,609,284 A | 3/1997 | Kondratenko .................. 225/1 |
| 5,622,540 A | 4/1997 | Stevens ....................... 65/112 |
| 5,742,026 A | 4/1998 | Dickinson, Jr. et al. ..................... 219/121.69 |
| 5,776,220 A | 7/1998 | Allaire et al. ................. 65/112 |
| 5,779,753 A | 7/1998 | Vetter et al. .................. 65/105 |
| 5,826,772 A | 10/1998 | Ariglio et al. .................. 225/2 |
| 5,871,134 A | 2/1999 | Komagata et al. ............. 225/2 |
| 5,968,382 A * | 10/1999 | Matsumoto et al. ... 219/121.72 |
| 6,236,446 B1 * | 5/2001 | Izumi et al. ................ 349/187 |

* cited by examiner

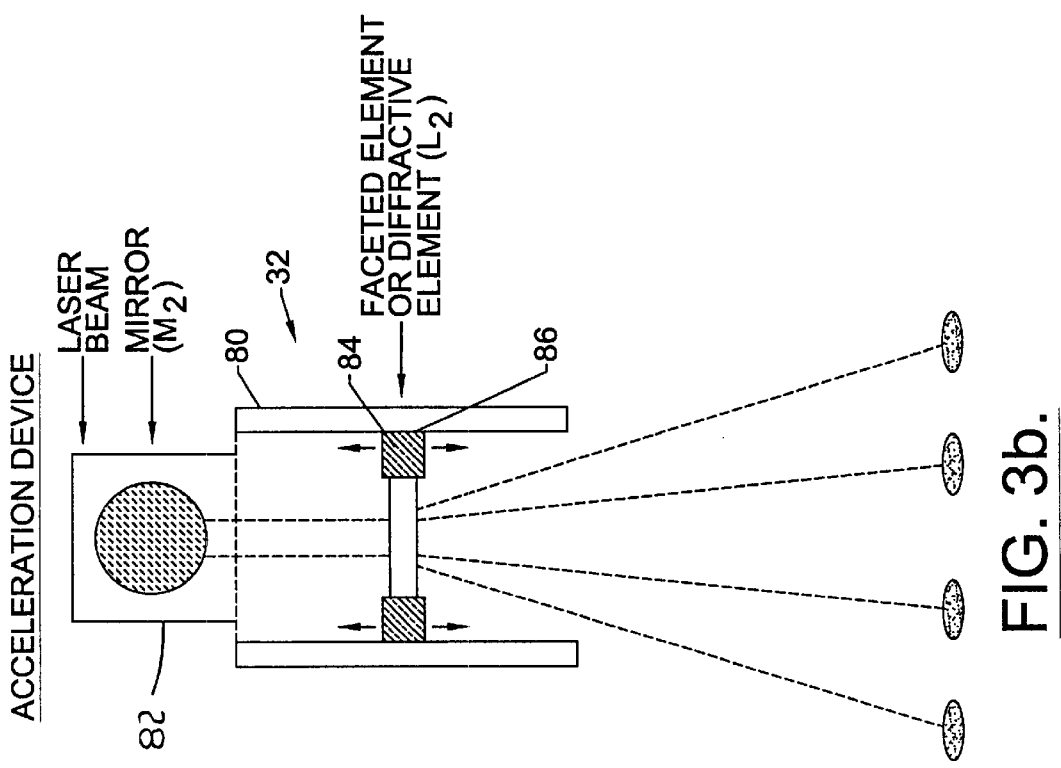
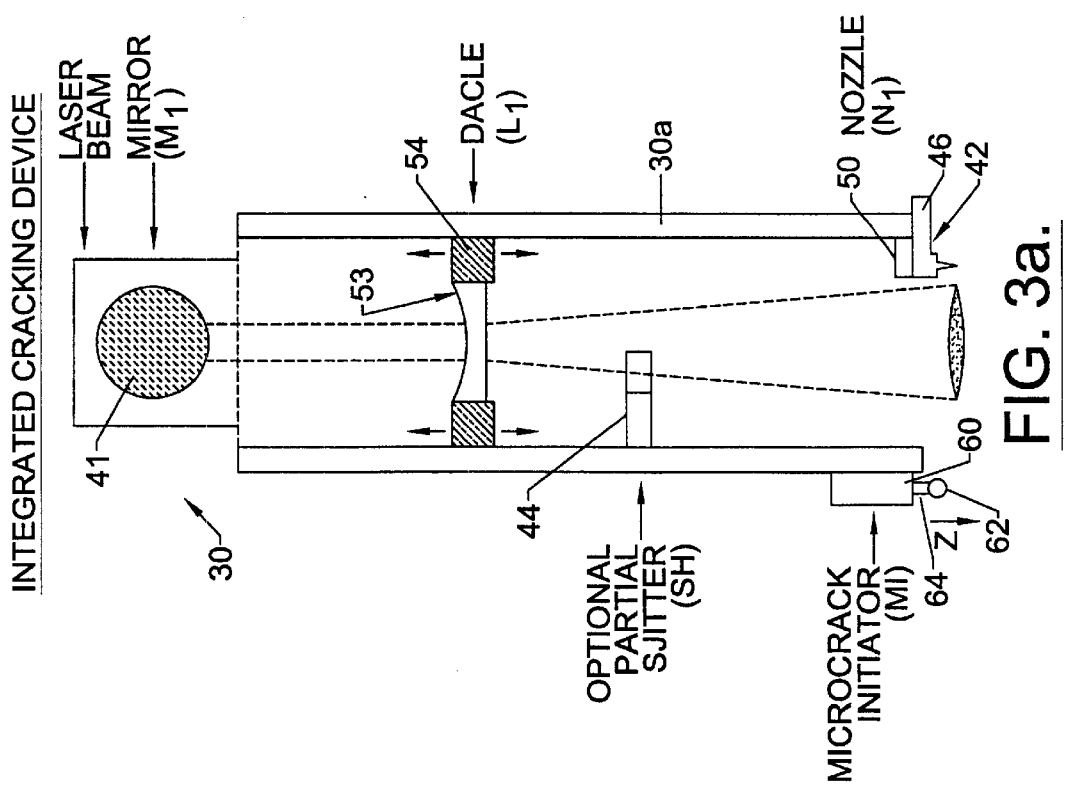

Double Asymetric Cylinder Lens Element
(DACLE)

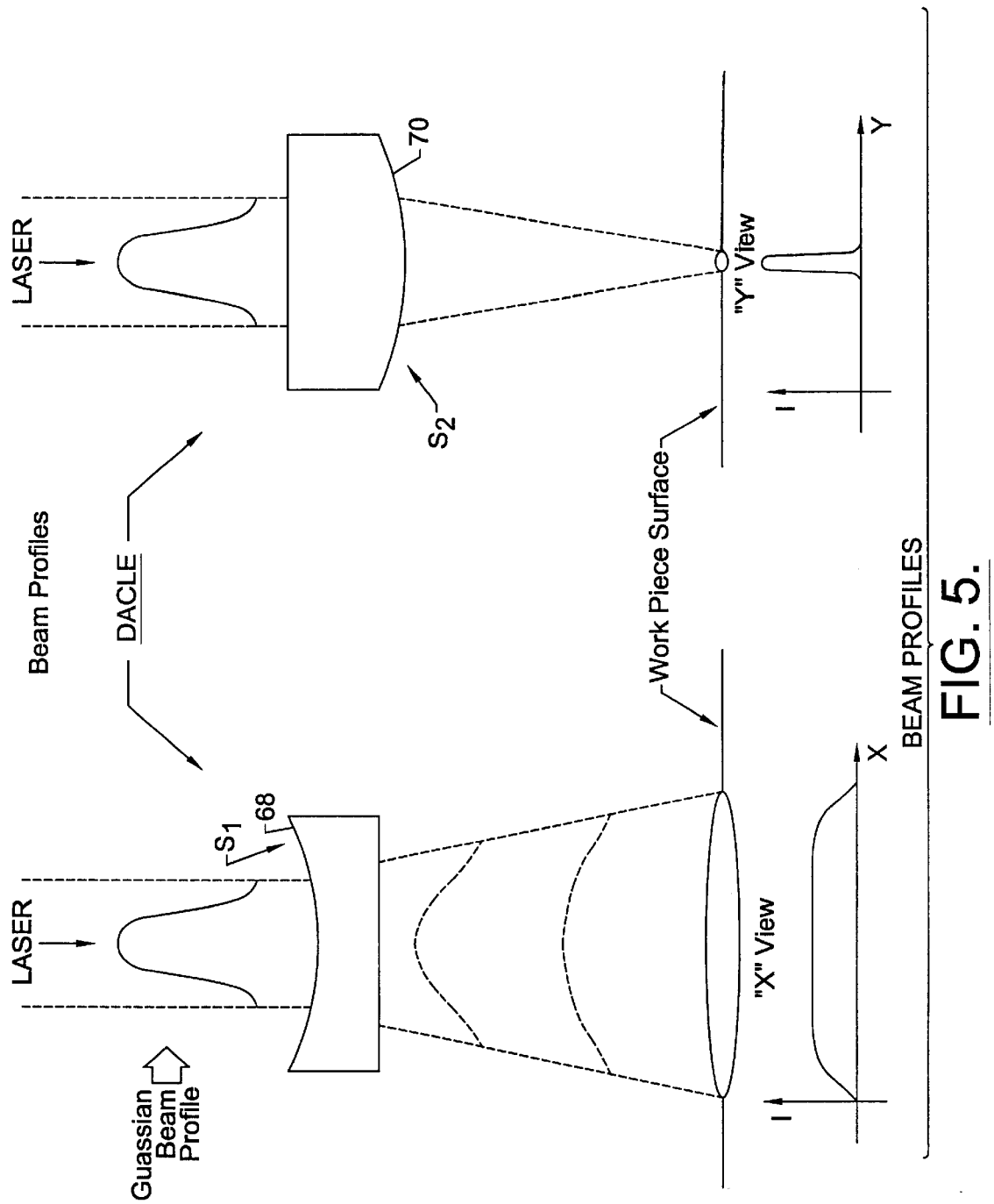

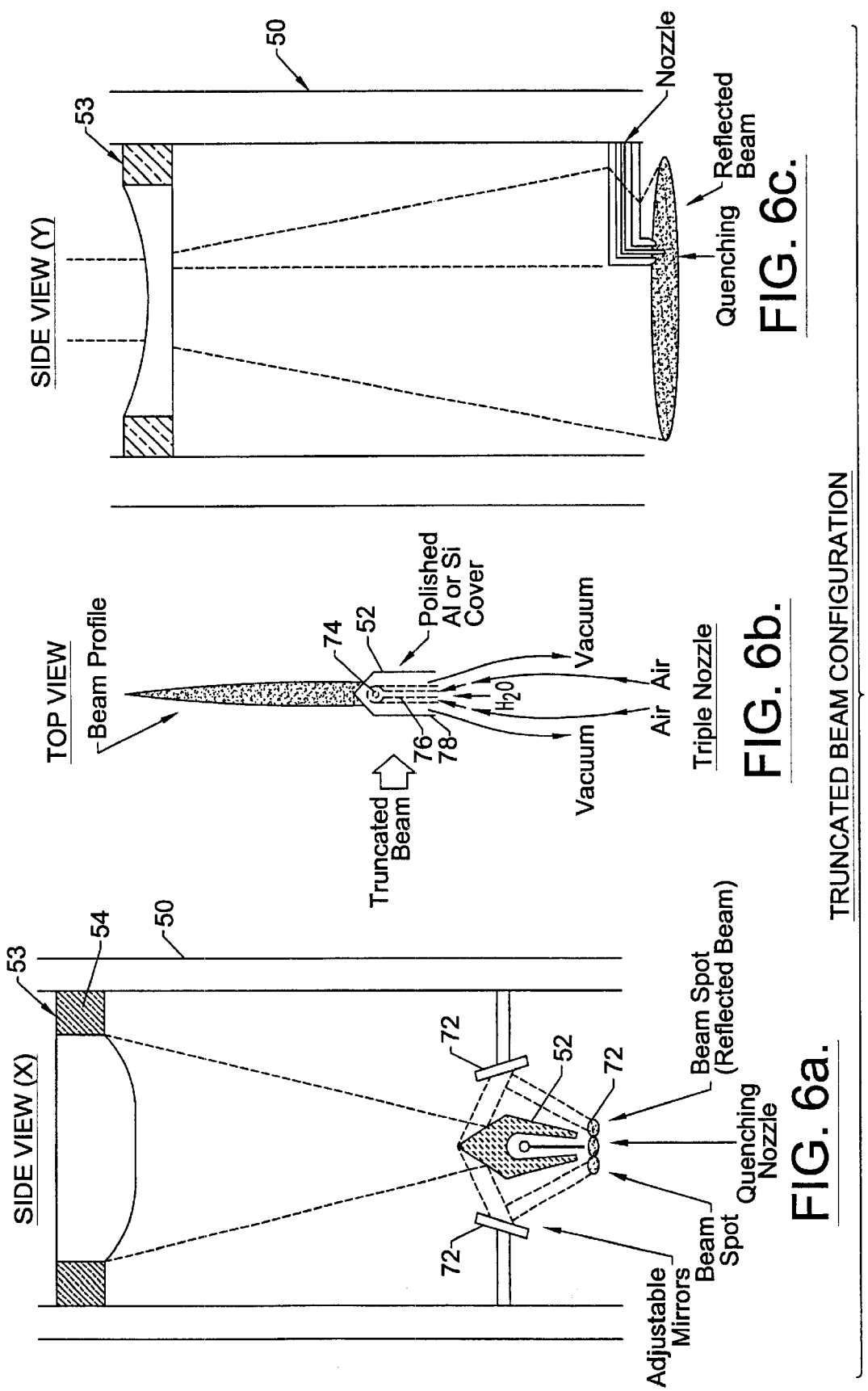

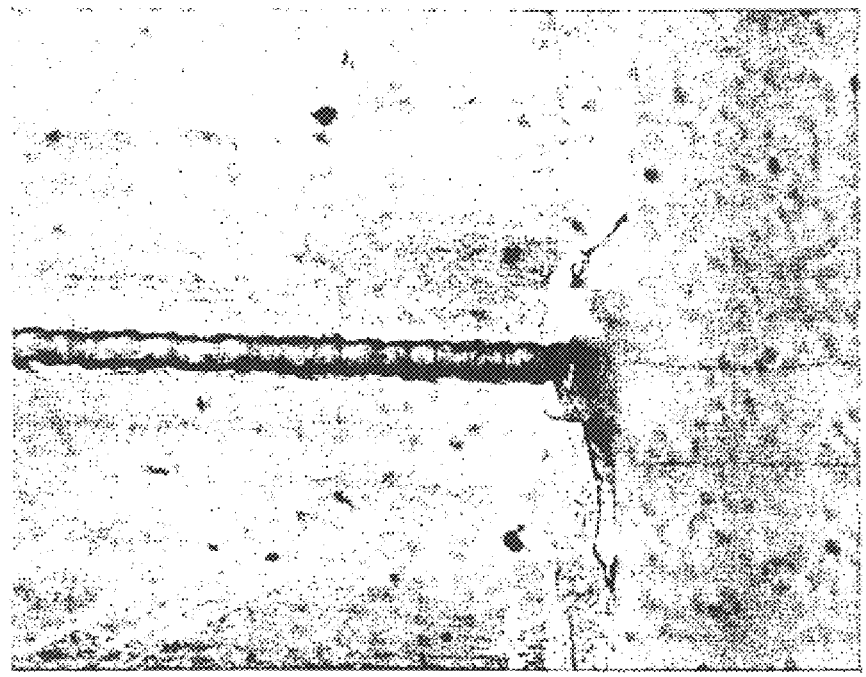
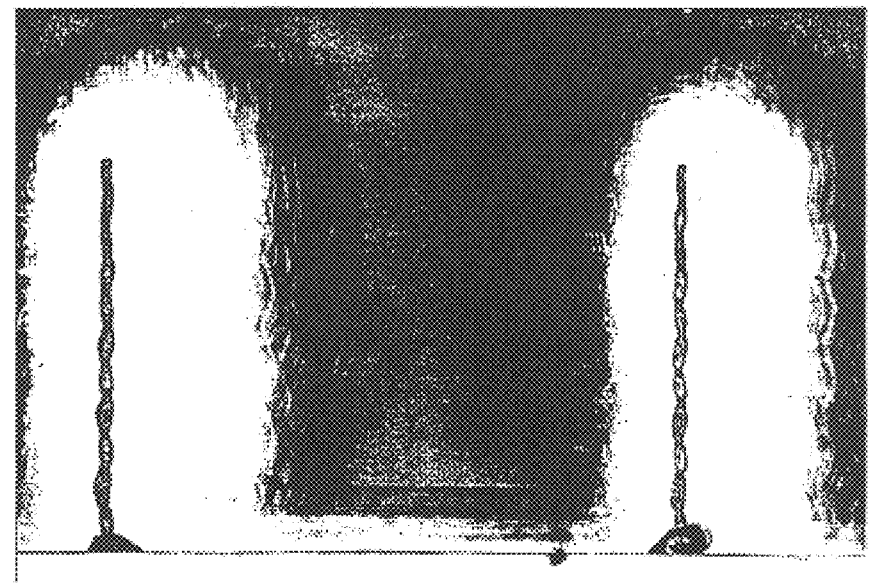
FIG. 10.

METHOD AND APPARATUS FOR SEPARATING NON-METALLIC MATERIALS

RELATED APPLICATION

This application is based upon prior filed copending provisional application Ser. No. 60/167,285 filed Nov. 24, 1999.

FIELD OF THE INVENTION

This invention relates to a method and apparatus for precisely separating non-metallic materials into a plurality of smaller pieces, and more particularly, this the invention relates to a method and apparatus for splitting non-metallic materials by controlling internal forces and propagating a microcrack to separate a material along a desired path.

BACKGROUND OF THE INVENTION

Propagating a microcrack in a brittle material by using a laser has-been known for at least three decades by those skilled in the art. In U.S. Pat. No. 3,610,871 to Lumley, the disclosure which is hereby incorporated by reference in its entirety, ceramic substrates are parted by reflecting a focused laser beam off a mirrored surface so that the focal point of the beam impinges upon the lower surface of the substrate of an extreme edge. After a localized fracture, the substrate is displaced, relative to the laser beam, to intercept the beam before it is reflected from the mirrored surface. The laser beam is intercepted by the upper surface of the substrate before the beam reaches its focal point, resulting in the beam energy being distributed over a larger area. As displacement continues, the localized fracture is controllably propagated.

This technique has not yet become commercially viable for many applications because of slow process speeds, complicated laser modes, poor understanding of laser scribing mechanisms, and time consuming, archaic two-step processes (e.g. scribe and break), which generate particulate and microcracks, thus counteracting a primary advantage of laser separation.

To overcome these and other known disadvantages, fast, reliable laser scribing, single step separation, and efficient use of a device that is simple yet powerful are desirable.

SUMMARY OF THE INVENTION

It is therefore an object of the present invention to provide a method and apparatus that separates non-metallic materials through highly controlled propagation of a microcrack and precise splitting.

The present invention is advantageous and includes features that enable fast process speeds, full separation, increased accuracy, highly controlled thermal gradients, improved edge quality, effective crosscutting, reduced edge effects, a simplified design, and increased flexibility and reduced cost.

The present invention is advantageous and provides a method and apparatus for splitting non-metallic substrates such as silicon or ceramic as non-limiting example, and comprises the steps of initiating a microcrack within a substrate and scribing the substrate with a laser beam at a heat affected zone that has been imparted onto the substrate by the laser beam. The microcrack is quenched at a quenching region that is contained within the heat affected zone by passing fluid from a quenching nozzle onto the substrate. A force is applied onto the substrate at a location behind the quenching region to break the substrate while maintaining residual forces below a critical breaking force in front of the quenching region.

The microcrack can be initiated with a mechanical initiator. In one aspect of the present invention, the laser beam is directed around the quenching nozzle via mirrors associated with the quenching nozzle. The fluid that is passed from the quenching nozzle can be a liquid and/or gas. A vacuum can also be drawn through the nozzle to remove any residual liquid and control gas flow. The temperature of the substrate can be elevated in a programmed manner before scribing, such as passing laser light through one of either a faceted or difractive optical lens element.

In yet another aspect of the present invention, the substrate is scribed with a laser beam via an integrated cracking device. The quenching nozzle is integral with the integrated cracking device. In yet another aspect of the present invention, the integrated cracking device includes a housing with the quenching nozzle mounted on the housing. Optics are fitted within the housing for receiving and directing the laser beam onto the substrate. In one aspect of the present invention, the optics include a mirror and single element lens fitted within the housing. The single element lens can comprise a double asymmetric cylinder lens element.

BRIEF DESCRIPTION OF THE DRAWINGS

Other objects, features and advantages of the present invention will become apparent from the detailed description of the invention which follows, when considered in light of the accompanying drawings in which:

FIG. 3A is an enlarged fragmentary sectional drawing of the integrated cracking device of the present invention.

FIG. 3B is an enlarged fragmentary drawing of the laser scribing acceleration device of the present invention.

FIG. 5 illustrates laser beam profiles developed by the double asymmetric cylinder lens element of the present invention.

FIGS. 6A through 6C illustrate a truncated beam configuration showing a side view (FIG. 6A), top view (FIG. 6B), and side view (FIG. 6C) of the quenching nozzle and showing the use of adjustable mirrors.

FIG. 10 is a copy of a photograph illustrating the operation of the invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

For purposes of description, there follows a detailed explanation of some of the problems encountered with existing systems, the drawbacks associated with these systems, and a discussion of the basic prior art technology.

There are two primary mechanisms used in designing a system for separating non-metallic materials: (1) the thermal and (2) stress/strain mechanisms. In the thermal mechanism, any brittle material exceeds its critical thermal shock temperature when its temperature is elevated to a desired level and then rapidly quenched to break its molecular bonds. This forms a "blind crack" in the material. In the second mechanism, the three-dimensional stress/strain field relationship within the material is analyzed. This field relationship varies because of internal thermal variations, external forces, internal forces, and the varying edge strength of the material. One aspect of this invention matches optimum thermal conditions for consistent and controllable thermal cracking (e.g. "laser scribing") with optimum stress/strain field conditions to separate fully a non-metallic material in a prescribed, controlled manner.

To propagate any microcrack through a brittle material, the system must exceed the critical thermal shock temperature ($\Delta Tcr$) or point at which the molecular bonds in the material break to form a blind crack within the material. This is normally accomplished by heating the material to a given temperature and quenching the material using a coolant stream to exceed the critical thermal shock temperature ($\Delta tcr$).

For some materials, $\Delta Tcr$ is minimal and little quenching is required to propagate successfully a microcrack. In these instances, a cooling gas alone, such as Helium, can be used for quenching. For other materials, especially those with low thermal expansion coefficients, a high gradient is required to exceed $\Delta Tcr$, and thus, a gas/water mixture is required for effective quenching. In this case, the latent heat released from the evaporation of the liquid is combined with convective and conductive heat transfer, and serves to quench the material in a more efficient manner, thereby exceeding the critical thermal rupture temperature.

Figure 1:
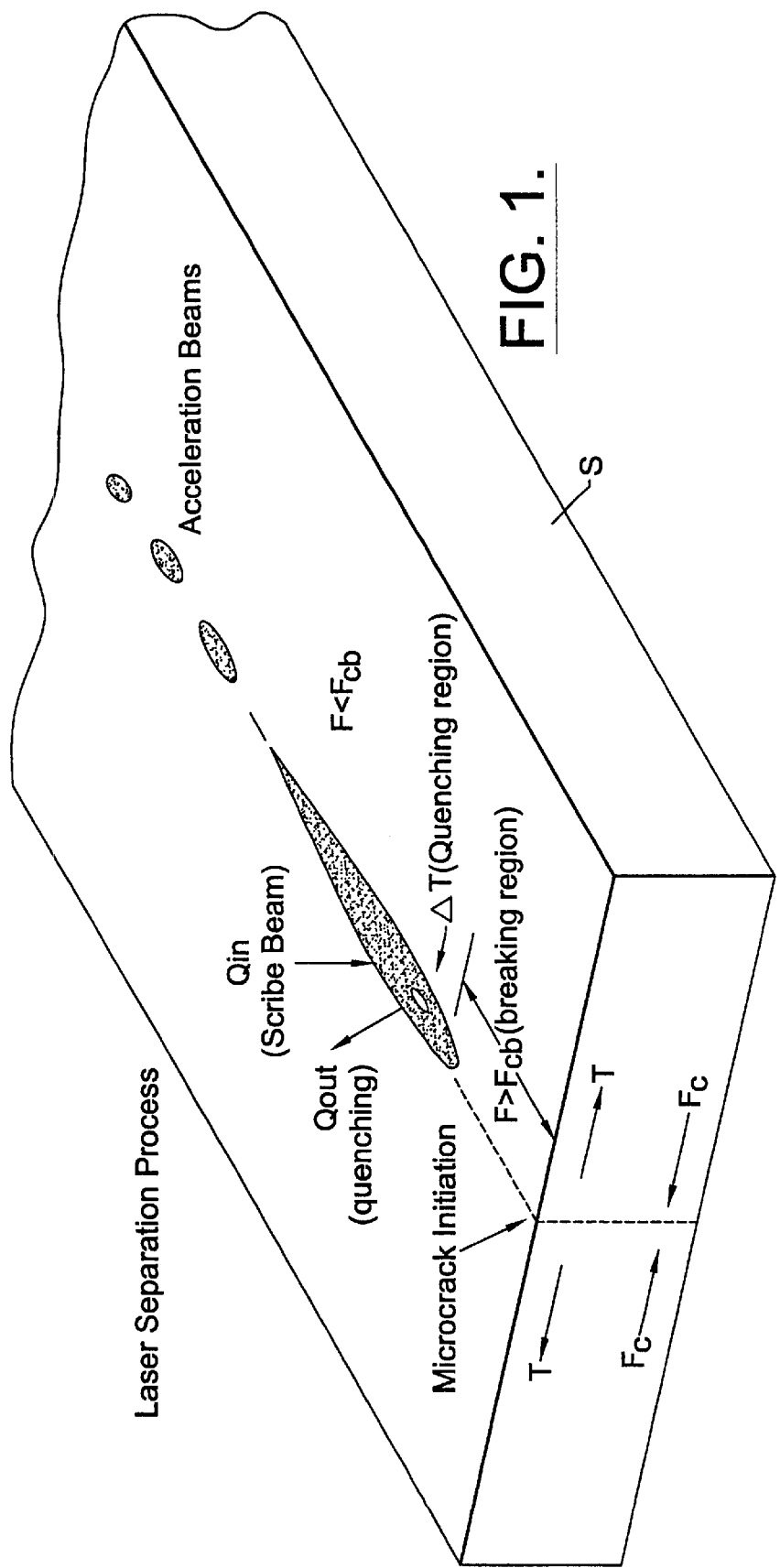
FIG. 1 is an enlarged drawing of the substrate showing the various stages of the splitting or laser separation process with microcrack initiation, acceleration, scribing and quenching, followed by breaking.

Even with optimized quenching, however, proper initial boundary conditions are required to successfully achieve laser scribing. The temperature of the material should be elevated to give the quenching "room" to exceed the critical thermal rupture temperature. Often, the process window between the minimum temperature and the maximum temperature, e.g., the softening temperature for glass, is very small. This requires precise control of the heat affected zone as shown in FIG. 1, illustrating the microcrack initiation in a substrate S, the breaking region, quenching region, scribe beam and acceleration beams, and energy, Qin and Qout, for respective scribe beam and quenching.

Traditional scribing operations typically required a second break step after an initial vent or blind crack was formed in the material. Using traditional mechanical methods for completing the break, a bending moment was imparted (such as by the use of a "guillotine" breaker). A force was applied to complete the separation of the material along the scribed area. The amount of force required to effect full separation is termed the Critical Breaking Force (Fcb). When scribing thin material (e.g. less than 0.5 mm), the residual tensile forces in the material separate the glass. For thicker material, however, the residual tensile forces resulting from the laser scribing operation are usually not sufficient to separate fully the material. In other cases, the tensile forces are excessively large and material separates in an uncontrollable manner, moving well ahead of the quenching region. The break is not straight because thermal gradients control symmetric separation dynamics. Some prior art designs used dual parallel beams without quenching as a separation mechanism. These designs, however, had asymmetries and caused irregular cuts. The present invention, on the other hand, separates a substrate in a controlled manner by applying a large enough force (Fcb) at an appropriate location behind the quenching region, while keeping the residual forces below the critical breaking force (Fcb) in front of the quenching region as shown diagrammatically in FIG. 1.

The entry and exit crack in any given material is an important consideration when separating a substrate in a controlled manner. The edge of a substrate is much weaker than its bulk portions making the material susceptible to uncontrolled cracking after introducing thermal shock. Also, any microcracks ca be present in the material, such as created by edge grinding or other mechanical processes. The microcracks must be considered. The material edge also tends to heat faster than other portions because the edge serves as a boundary between conductive and convective heat transfer regions. The present invention aids in overcoming edge effects, such as intrusions and extrusions.

An initial microcrack is required to propagate a microcrack through a material. Many materials already have microcracks positioned along their edges as result of previous manufacturing processes. It has been found more desirable, however, to introduce a microcrack in a controlled manner at a given location than to rely on residual microcracks. Edge treatment techniques, however, have improved, and thus it is more difficult to initiate a microcrack along these new types of edges that have been engineered to withstand cracking. The present invention aids in reliable scribe initiation along these better engineered edges.

Once a substrate has been fully separated in one direction, making cuts in a second direction (usually 90 degrees) becomes more challenging. One prior art method for breaking a substrate in the new direction is disclosed in U.S. Pat. No. 5,826,772 to Ariglio et al., the disclosure which is hereby incorporated by reference in its entirety. In Ariglio et al., a laser is moved across a surface to form two vent cracks on respective sides. A bending movement is applied under the vent cracks to break the sheet. The system does not work adequately for separated boundaries.

One conventional system requires two steps to break the material: (1) a scribe step; and (2) a mechanical breaking step. This type of system is commonly used when the substrate thickness is greater than 0.5 mm, and the residual tensile forces in the substrate are not sufficient to separate the substrate.

Another conventional system uses wide dual break beams, usually greater than 8 mm, causing thermal shock on the perimeter of an intended cut. This weakens the glass and/or uncontrollably cracks the glass. Sometimes separation occurs within a limited path width because electronic devices or coatings/layers are positioned on either side of the cut.

Laser beam delivery systems that require multiple optical elements also offer little flexibility in their designs. These multiple optical elements absorb or reflect a significant amount of the laser power, e.g., 5% per element for AR coated ZnSe elements, resulting in a loss of more than 36%, if a six element system is used. Additionally, complex optical systems are massive, difficult to move, require precise alignment, and calibration, which can easily be jarred out of place. Finally, the critical distances commonly existing between the quenching nozzle, the scribe beam, the break beams, and scribe initiation are difficult to adjust and are inherently unstable.

Many conventional systems accomplish unidirectional cutting only because of the large mass of a beam delivery system, and the independent control of not only scribe initiation, but also the quenching nozzles and similar elements.

In some manufacturing systems, there is room for only one laser head per machine. Therefore, multiple heads that cut simultaneously to save time in manufacturing are not possible. Some fixed optical systems require almost twice the conventional equipment footprint because of the inherent inefficiencies resulting from moving the workpiece under a laser beam, instead of moving the laser relative to the workpiece.

The distance between the scribe and break beams is fixed in many prior art designs and the footprint of a machine is limited to a finite width, limiting machine flexibility when changing from one material to another material. Also, the relative beam power between the scribe and break beams is regulated by physically changing a beam splitter or adjusting a faceted element. When using a beam splitter, the relative power is a function of the coating on the beam splitter and is difficult to reproduce. Conventional nozzle designs lead to inconsistent flows and leave water or other liquid residue on the workpiece.

Figure 2:
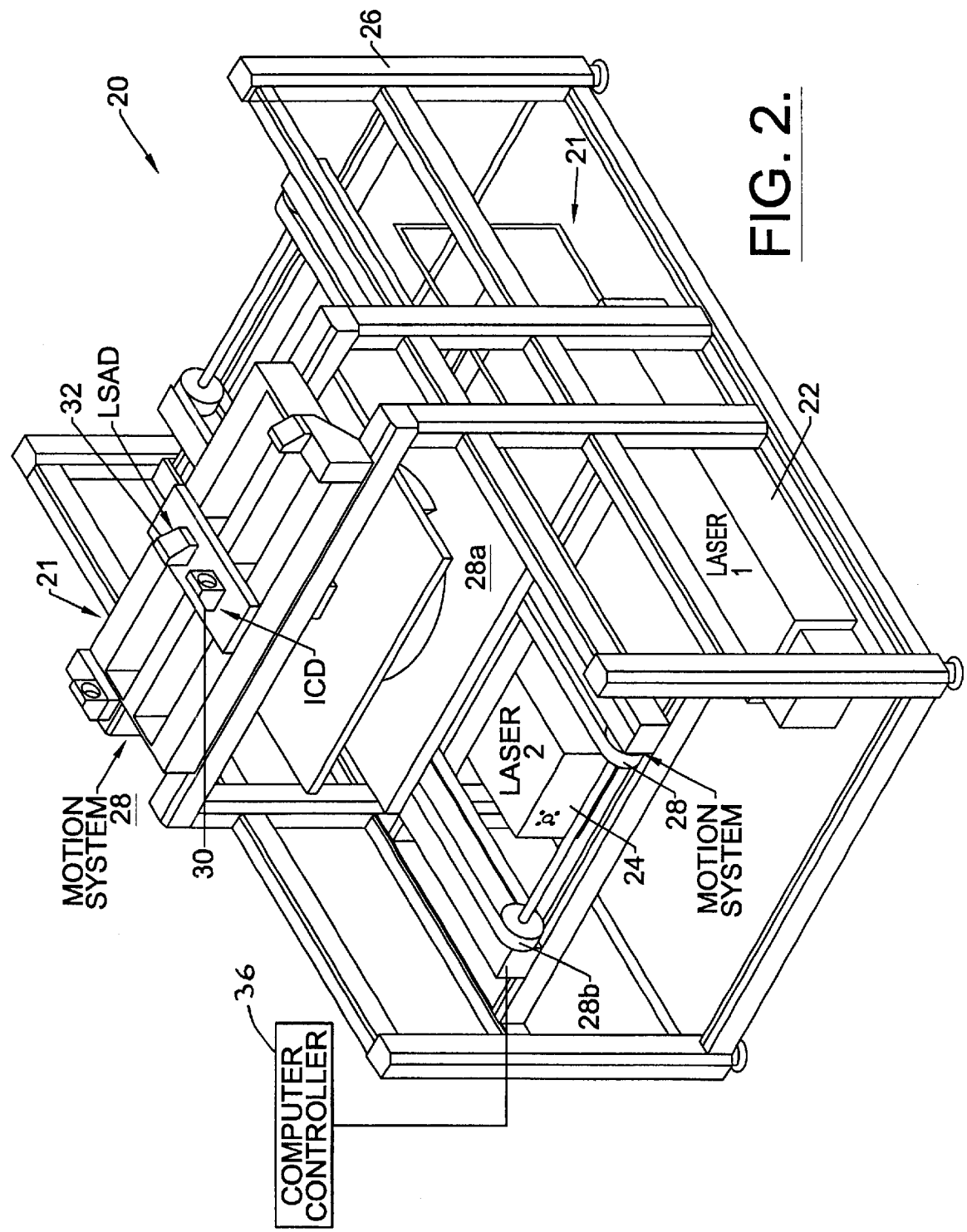
FIG. 2 is an isometric drawing of the apparatus for splitting non-metallic substrates of the present invention.

Referring now to the drawings, and more particularly FIG. 2, the major components of the present invention form a full material separation laser system, and is illustrated generally at 20. The system includes single or multiple laser sources and associated options, forming an optical system, indicated generally at 21. In the illustrated embodiment, the optical system 21 includes two lasers 22, 24, which are supported on a machine frame 26. A motion system 28 includes a support table 28a that traverses the frame by belt drive mechanism 28b and moves the workpiece relative to the optical system 21 formed by the lasers 22, 24. The lasers form two (or more) beam paths. The system includes an integrated high gradient cracking device (ICD) 30, a laser scribe acceleration device (LSAD) 32, and a supplemental breaking device 34.

The laser source, whether one or two lasers, is chosen based on the material to be separated. The laser source should be efficient, reliable, and have an output wavelength with an absorption coefficient close to 100%, allowing laser radiation to be absorbed primarily at the surface of the material to be separated. For example, when scribing glass, a $CO_2$ laser source with an output frequency of 10.6 microns is desirable. When scribing silicon, a YAG laser source with an output frequency of 1.06 microns or less is desirable. The laser should operate in the $TEM^{00}$ mode, thus providing a beam profile that is predominately guassian in shape. If flying optics are used, uniform collimated output should be achieved such that the laser beam profile does not appreciably change from one point to another. It is also advisable to provide enough space between the output of the laser and the flying optics, allowing the laser beam time to transition in "far field" conditions.

The selection of the laser output frequency does not necessarily have to correspond with maximum absorption efficiency at the LSAD 32 beam path. It may be desirable to select a laser frequency significantly less than 100% to allow for heating throughout the body of the material. This serves to heat efficiently the bulk of the material in the region of interest, while limiting tensile forces and radiative heat loss at the surface. It is important, however, to achieve the same collimation criteria previously mentioned.

In some cases, different laser frequencies can be mixed within the same region or beam spot. For example, a laser may be used to preheat a material at a frequency that is highly absorbed. The material can then be subsequently heated by a laser of differing frequency that would normally not be highly absorbed by the material. This is possible because of increased temperature dependent absorption or free carrier absorption.

The motion system 28 uses a computer 36 to control the movement of the workpiece W relative to the laser output. One possible control method generates control signals from the computer to move the workpiece in the x, y, and θ directions while holding the optics stationary. Conversely, a workpiece can remain stationary, while the optical system carrying the laser is moved in all directions. A hybrid approach allows both the optical system and the workpiece to be moved in limited directions. By rotating the optical system 180 degrees, bidirectional cutting is possible. A multiple ICD array formed from ganged or operatively connected ICD 30 units could increase production. A multiple ICD 30 can be moved into the beam path at an appropriate time. It is also possible to cut on both the top and bottom side of the material by placing the workpiece on a process table with slots underneath any desired cuts. The process table can also facilitate breaking when a roller breaking device is placed underneath the workpiece.

FIG. 3A illustrates the integrated high gradient cracking device 30 of the present invention. An integrated optical path 40 is formed by mirror (MI) 41, which receives the laser beam. The ICD 30 also includes a quenching mechanism 42, optional shutter 44, and water removal mechanism 46 associated with the quenching mechanism. This device is simple and flexible, allowing a user to achieve the desired high thermal gradients in a material. A triple, reflective quenching mechanism (TRQM) in the form of a preferred quenching nozzle 50 of the present invention is illustrated at FIGS. 6A, 6B and 6C, and can be used for controlled high temperature gradients in a substrate.

The nozzle 50 is fitted with a reflective cover 52 (FIG. 6B) to redirect the laser beam around the nozzle and cause a portion of the laser beam radiation to impinge on the workpiece near, adjacent to, intersecting, around, or within the quenching region.

Figure 4:
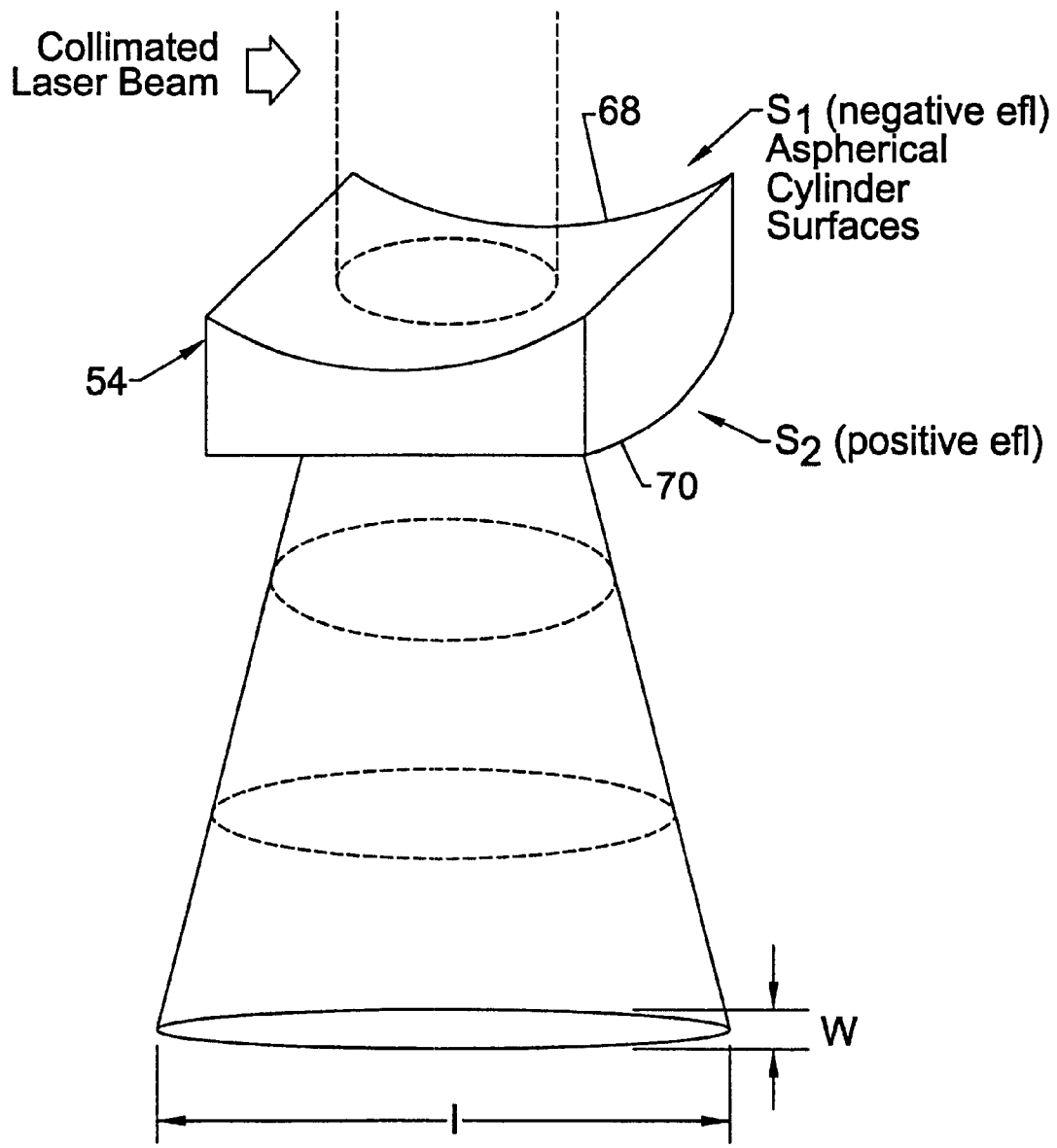
FIG. 4 is an enlarged fragmentary view of the double asymmetric cylinder lens element that is contained within the integrated cracking device of the present invention.
Figure 7A:
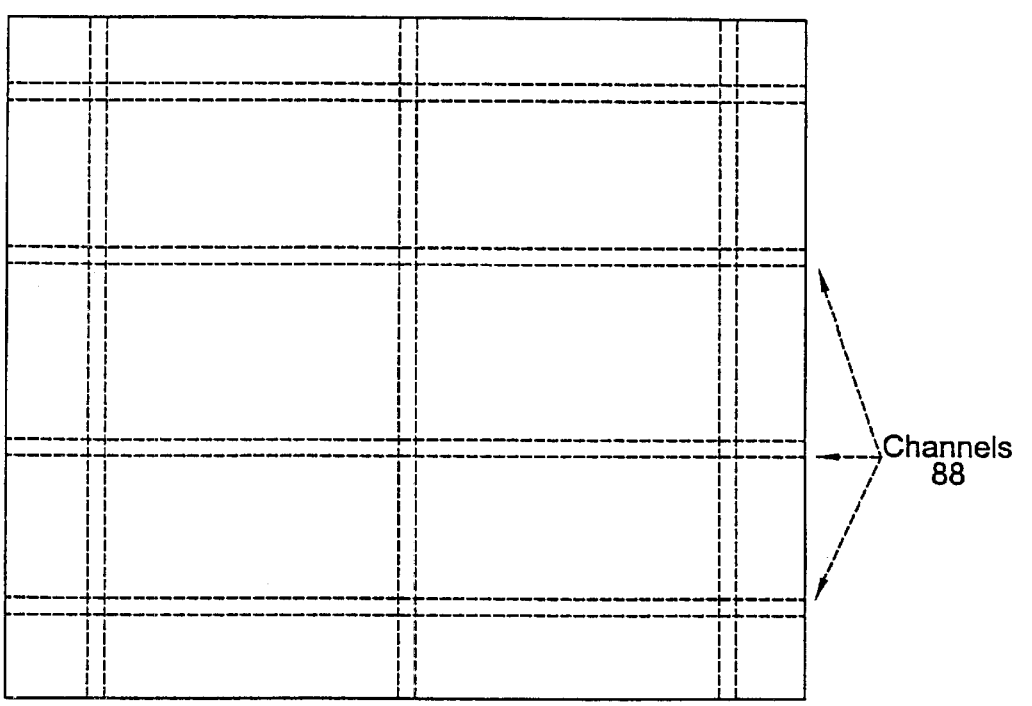
FIGS. 7A through 7D show the use of the inflatable channel bladder that can be used with the present invention.
Figure 7B:
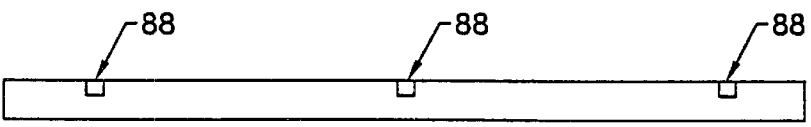
Figure 7C:
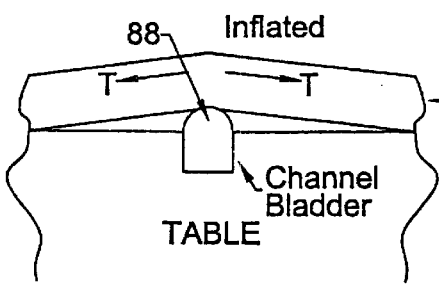
Figure 7D:
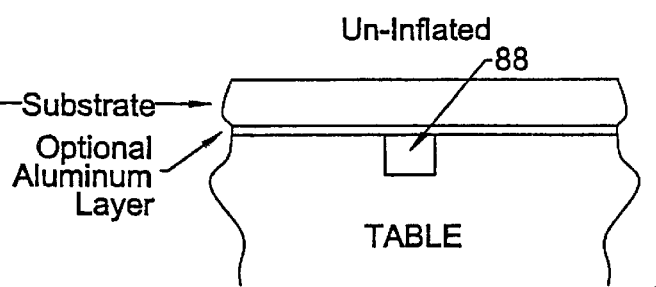

In one aspect of the present invention, a custom, single element lens L1, shown generally at 53, is used in the ICD 30 for laser scribing. This makes an efficient and flexible design. A single element can reduce the size and weight of the laser head by more than 70%. In yet another aspect of the present invention, the custom lens comprises a Double Asymmetric Cylinder Lens Element (DACLE) 54 (FIGS. 3A and 4), which is used in the present invention to achieve a desired laser beam profile.

Figure 9:
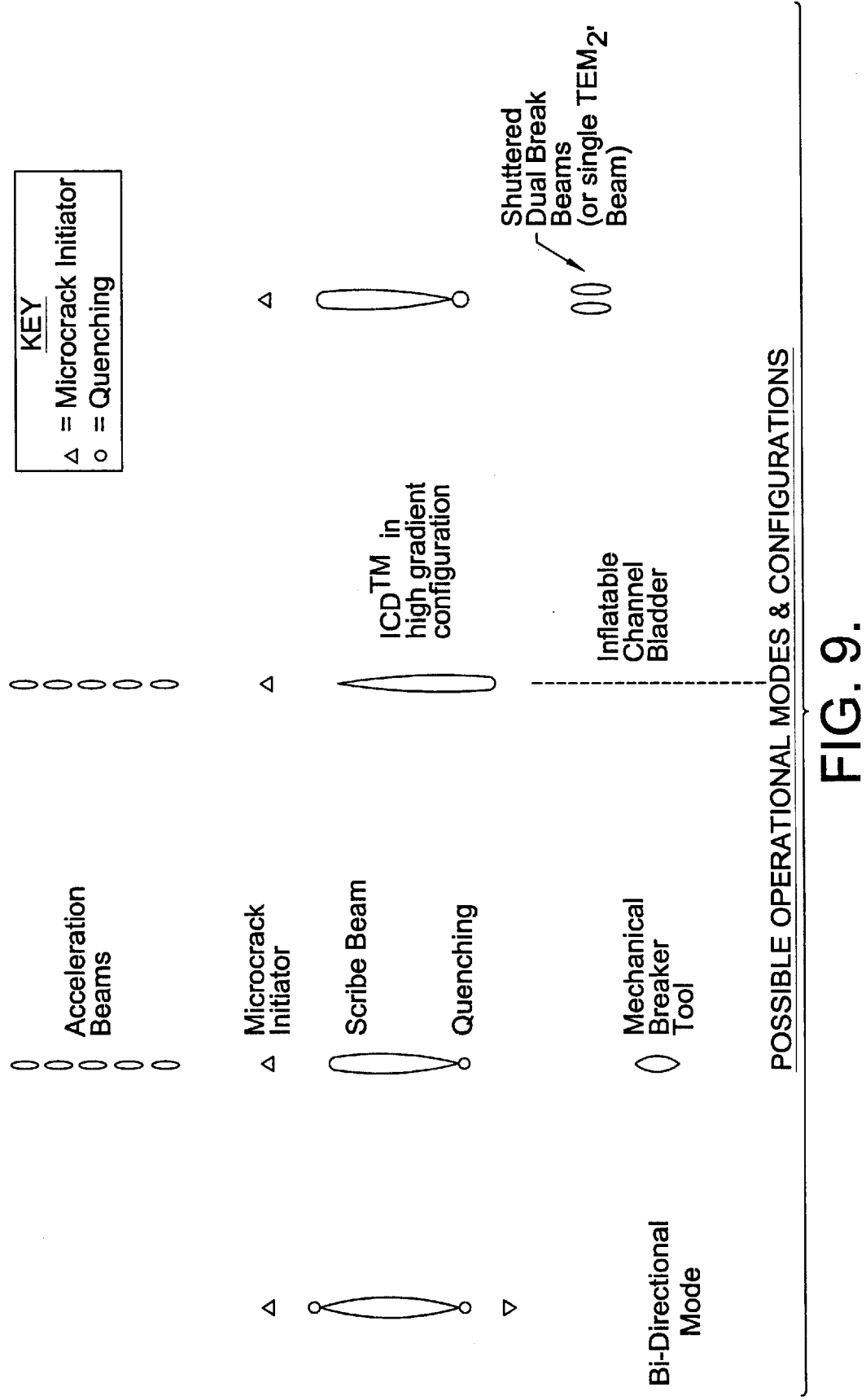
FIG. 9 illustrates possible operational modes and configurations with various modes as illustrated.

A microcrack initiator (MI) 60 is mounted directly on the ICD housing 30 and, in one aspect of the invention, is operable by a standard scribe wheel 62 that is mounted on a vertical drive, z stroke mechanism 64, to create a microcrack on the edge of the material to be separated. The MI 60 is operable after the Laser Scribe Acceleration Device (LSAD) 32 operation to reduce any chance that the heat generated by the LSAD will prematurely propagate a microcrack. The system of the present invention can also incorporate a Laser Scribe Initiation option using ablative YAG pulses at the surface of the glass as shown in photo 1 of FIG. 9.

Referring once again to FIG. 3A, the integrated cracking device 30 includes the housing 30a formed in one aspect of the invention as a single tube, either circular or square in cross-section. The ICD 30 includes the single custom optical element (L1) indicated generally at 53, in the form of a DACLF 54, in one aspect of the invention, and microcrack initiator (MI) 60, quenching mechanism (Q1) 42, as part of nozzle 50, mirror element (M1) 41, and shutter 44.

The single optical element 53 is designed to provide an optimal thermal footprint that is, in general, an elliptical beam no greater than 80 mm long and no wider than 5 mm. It is also desirable for this element to exhibit a flat top profile in each direction. This can be achieved in a number of ways using a collimated input beam. A diffractive optical element can be used when the internal structure of the lens is altered to provide a preprogrammed output profile. Another and less expensive way is the use of the Double Asymmetric Cylindrical Lens Element (DACLE) 54, as shown in greater detail in FIG. 4. The curved "concave" surface (Si) 68 is configured to have an optimum negative focal length to control the beam length (l) and energy distribution in the direction of the cut (x). The opposite curved or "convex" surface (S2) 70 is configured to have an optimum positive focal length and control the beams width (w) and its energy distribution orthogonal to the cut direction (y). The curved surfaces are programmed to provide an output that is optimal for cutting. An example of an optimum profile is shown in the DACLE beam profiles of FIG. 5 showing "x" and "y" views and the guassian beam profile.

Reflective features that are built into the quenching nozzle 50 can further modify the optimum output profile, and enable the quenching region to be placed entirely within the heat affected zone, as shown in FIG. 1. This helps achieve the desired high gradients in the quenching region, places tensile forces behind the quenching region, and creates a heated zone behind the nozzle that can be used to evaporate any residual liquid from the nozzle. It adds flexibility to the system by allowing a user to place the quenching virtually anywhere within the boundary of the beam spot. This can not be accomplished using traditional non-reflective nozzle designs because the prior art nozzles block the radiation form the workpiece, making it difficult, if not impossible, to place the quenching within or directly in contact with the beam spot. The reflective nozzle also permits an extended beam path, which causes the energy density to be higher than the front section of the beam, thereby creating higher tensile forces behind the quenching zone.

FIG. 6A ("x" view) illustrates the quenching nozzle 50 of one aspect of the present invention, and shows the adjustable mirrors 72 and reflective cover 52. The mirrors are positioned somewhat equilaterally, although not necessary, and reflect off the mirrors to form a beam spot. In accordance with the present invention, the quenching region is contained within the heat affected areas shown in FIGS. 6A–6C. In addition to reflective features provided by adjustable mirrors, the TQRD has three distinct fluid systems that provide efficient quenching, as shown in FIG. 6B. In a preferred configuration, a liquid, such as water, is channeled through a middle tube 74, a gas is directed through a coaxially configured outer tube 76, and a vacuum is applied to the outermost region 78 (FIG. 6B). In this configuration, high pressure air dynamically channels the liquid toward the center of the quenching region, while the vacuum removes any residual liquid and controls the air flow. An optional high frequency piezo-electric transducer (not shown in detail) can be placed on the nozzle to help break up and atomize the water to improve quenching efficiency. FIG. 6C illustrates the "y" view.

Figure 8:
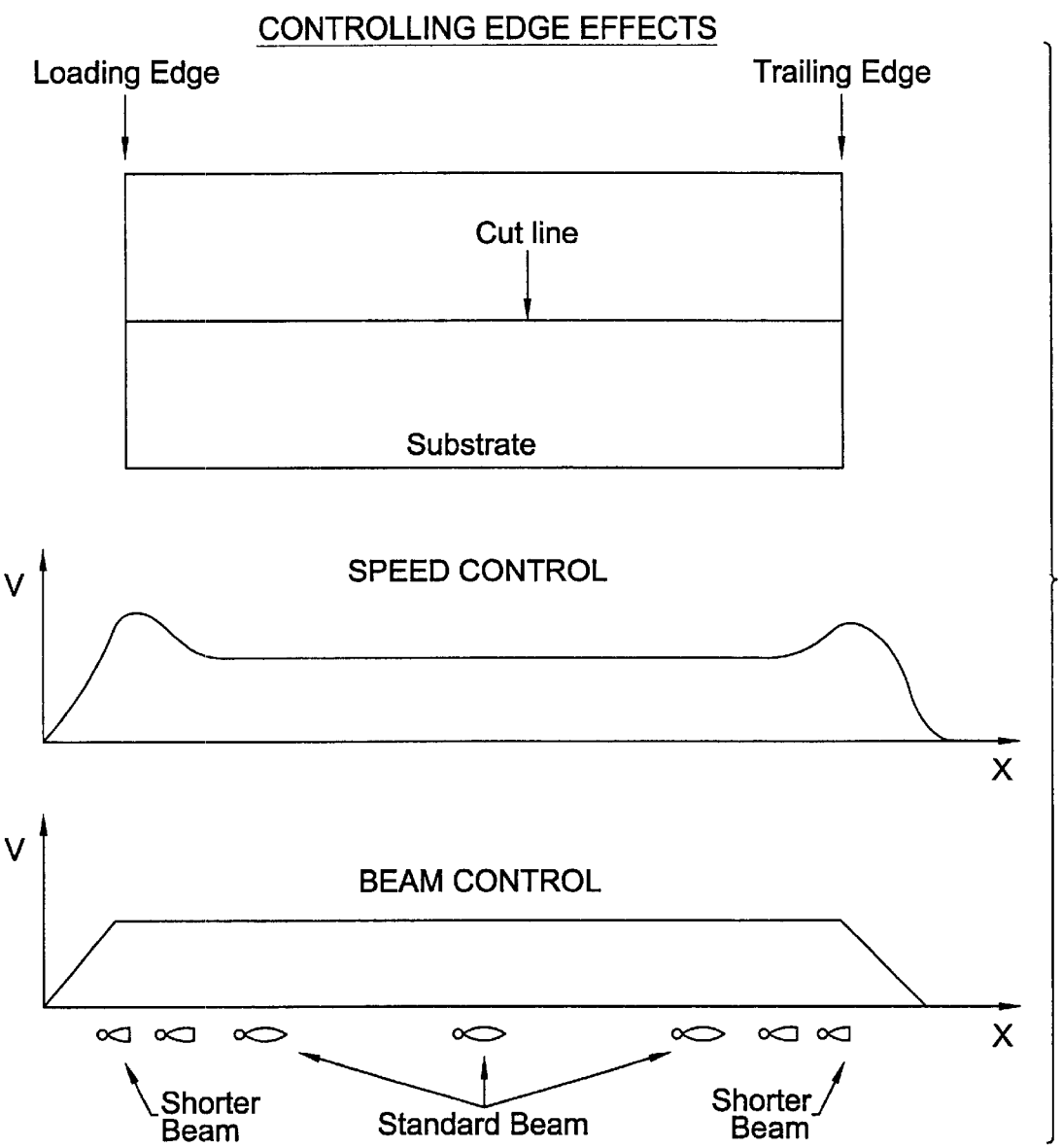
FIG. 8 shows the leading and trailing edge of a substrate and showing speed and beam control relative to the cut line and how edge effects are controlled.

As shown in FIG. 3A, the optional shutter 44 is placed between the custom lens element 53 and the workpiece W and can be used to block selectively a portion of the laser radiation to effectively shorten the beam spot on the workpiece. The shutter 44 can change the beam length during the laser cutting process and achieve a desired affect. For example, the shutter can truncate a front section of the laser beam while the laser beam is near the leading or trailing edge of the substrate to avoid overheating the edges, as shown in the edge effect diagram of FIG. 8.

The laser scribe acceleration device (LSAD) 32 (FIG. 3B) elevates the temperature of the workpiece in a programmed manner, allowing increased process speeds. This device 32 is positioned a finite distance in front of the ICD and helps establish the proper thermal boundary conditions for the scribe beam. Thus, the ICD achieves precise microscopic thermal gradients and practice scribing.

In one aspect of the present invention as shown in FIG. 3B, the LSAD 32 is similar in design and construction to the ICD. The LASD 32 includes a housing 80, mirror M2 82, and single lens element 84 incorporated into a mounting device 86 which, in turn, is secured in the housing 80 (FIG. 3B). The single lens element 84 can be a faceted element or diffractive element. A single long beam or a series of beam spots can be used depending on the application. An advantage of using a series of beam spots is that the relative power of each spot can be adjusted to provide for a gradual increase in the heating or energy density of the material. In addition, various laser wavelengths can be used to tailor the heating in the z direction of the material. Modeling and experimentation can determine optimum LSAD parameters.

The substrate breaking device 34 permits full separation of substrates, using a variety of techniques, including: (1) chilling the bottom surface of the substrate; (2) heating the top of the substrate using a stream of hot air, dual laser beams, a single laser beam, or a single laser beam operating in the TEM20 mode; (3) mechanically stressing the substrate in the desired manner utilizing innovative features built into a process table; (4) an inverse roller breaking device to create the desired compressive/tensile forces in the substrate; and (5) Shear force separation techniques for laminated glass to eliminate or reduce microcracks.

Selectively chilling the bottom surface of the substrate or providing a heat sink directly underneath the intended cut introduces compressive forces to aid in full separation. This can be combined with other techniques. Introducing heat at the surface of the substrate creates tensile forces on the substrate surface that facilitate full separation. Placing an expandable tube 88 in a channel of the support table for the substrate, as shown in FIG. 7, increases the tensile forces on the substrate surface. The inflatable tube can be advantageously deflated to bring the substrate back to a flat orientation. This facilitates crosscutting. The tube can be filled with chilled water to chill the substrate at its bottom surface. Additionally, a roller breaking device can be positioned underneath the substrate and moved along the cut path a given distance behind the scribe area to effect full separation. This works best if the process table has slots underneath the intended cut. As a result, the force is placed well behind the scribe area, thereby ensuring straightness. Shear forces can also be used to separate substrates. These types of forces are especially useful for laminated materials, and will help minimize or reduce microcracks in the middle layer of a laminate by eliminating the bending moment introduced by the other techniques mentioned above.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. An apparatus for splitting non-metallic substrates comprising:
    a laser for generating a laser beam;
    an integrated cracking device for receiving the laser beam and directing the laser beam onto a non-metallic substrate to define a heat affected zone and quenching the substrate at a quenching region contained within the heat affected zone, said integrated cracking device comprising
    a housing;
    optics fitted within the housing for receiving and directing the laser beam onto the substrate; and
    a quenching nozzle mounted on the housing for quenching the substrate at a quenching region defined within the heat affected zone.

2. An apparatus according to claim 1, and further comprising a mechanical initiator mounted on the housing for initiating a microcrack that requires the laser beam that had been directed from the integrated cracking device.

3. An apparatus according to claim 1, and further comprising mirrors associated with the quenching nozzle for directing the laser beam around the quenching nozzle.

4. An apparatus according to claim 1, wherein said quenching nozzle further comprises fluid channels for passing one of at least liquid or gas onto the substrate.

5. An apparatus according to claim 4, wherein said quenching nozzle further comprises both liquid and gas channels for passing both liquid and gas onto the substrate.

6. An apparatus according to claim 5, wherein said quenching nozzle further comprises a vacuum channel for drawing vacuum through the quenching nozzle to remove any residual liquid and control gas flow.

7. An apparatus according to claim 1, and further comprising a laser scribe acceleration device for directing laser light onto the substrate before the integrated cracking device and elevating the temperature of the substrate.

8. An apparatus according to claim 7, wherein said laser scribe acceleration device further comprises one of either a faceted or diffractive lens element.

9. An apparatus for splitting non-metallic substrates comprising:
    a laser for generating a laser beam;
    an integrated cracking device for receiving the laser beam and directing the laser beam onto a non-metallic substrate to define a heat affected zone and quenching the substrate at a quenching region contained within the heat affected zone, said integrated cracking device comprising
    a housing;
    a mirror and a single element lens fitted within the housing for receiving and directing the laser beam onto the substrate; and
    a quenching nozzle mounted on the housing for quenching the substrate at a quenching region defined within the heat affected zone.

10. An apparatus according to claim 9, wherein said single element lens comprises a double asymmetric cylinder lens element.

11. An apparatus according to claim 9, and further comprising a mechanical initiator mounted on the housing for initiating a microcrack that receives the laser beam that had been directed from the integrated cracking device.

12. An apparatus according to claim 9, and further comprising mirrors associated with the quenching nozzle for directing the laser beam around the quenching nozzle.

13. An apparatus according to claim 12, wherein said quenching nozzle further comprises fluid channels for passing one of at least liquid or gas onto the substrate.

14. An apparatus according to claim 13, wherein said quenching nozzle further comprises both liquid and gas channels for passing both liquid and gas onto the substrate.

15. An apparatus according to claim 14, wherein said quenching nozzle further comprises a vacuum channel for drawing vacuum through the quenching nozzle to remove any residual liquid. and control gas flow.

16. An apparatus according to claim 15, and further comprising a laser scribe acceleration device for directing laser light onto the substrate before the integrated cracking device and elevating the temperature of the substrate.

17. An apparatus according to claim 16, wherein said laser scribe acceleration device further comprises one of either a faceted or diffractive lens element.

* * * * *